United States Patent
Hagiyama (10) Patent No.: US 8,505,909 B2
(45) Date of Patent: Aug. 13, 2013

(54) FEEDING APPARATUS, ELECTRONIC APPARATUS INCLUDING FEEDING APPARATUS, AND FEEDING METHOD

(75) Inventor: Noriyuki Hagiyama, Shizuoka (JP)

(73) Assignee: NEC Access Technica, Ltd., Shizuoka (JP)

( * ) Notice: Subject to any disclaimer, the term of this patent is extended or adjusted under 35 U.S.C. 154(b) by 334 days.

(21) Appl. No.: 12/938,938

(22) Filed: Nov. 3, 2010

(65) Prior Publication Data

US 2011/0135369 A1    Jun. 9, 2011

(30) Foreign Application Priority Data

Dec. 9, 2009   (JP) ................................ 2009-279053
Jul. 12, 2010   (JP) ................................ 2010-157788

(51) Int. Cl.
*B65H 5/06*    (2006.01)

(52) U.S. Cl.
USPC .......................................... 271/186; 271/273

(58) Field of Classification Search
USPC .................... 271/272, 273, 291, 65, 301, 186
See application file for complete search history.

(56) References Cited

U.S. PATENT DOCUMENTS 5,640,901 A * 6/1997 Kinoshita ..................... 100/169
2009/0085280 A1* 4/2009 Litman et al. ................. 271/186

FOREIGN PATENT DOCUMENTS

| JP | 05-310356 A | 11/1993 |
| JP | 09-086807 A | 3/1997 |
| JP | 2005-335915 A | 12/2005 |
| JP | 2006-103946 A | 4/2006 |

* cited by examiner

*Primary Examiner* — Michael McCullough
(74) *Attorney, Agent, or Firm* — Sughrue Mion, PLLC (57) ABSTRACT

A feeding apparatus according to the present invention includes an object feeding path, a temporary object feeding path branched from the object feeding path, an object feeding unit arranged on the object feeding path, the object feeding unit feeding an object; and a pair of rollers arranged on the temporary object feeding path. The pair of rollers pinches the object and feeds the object from the object feeding path toward the temporary object feeding path while keeping one edge of the object as a feeding head. The pair of rollers pinches the object and feeds the object from the temporary object feeding path toward the object feeding path while keeping the other edge of the object as a feeding head.

18 Claims, 9 Drawing Sheets

FEEDING APPARATUS, ELECTRONIC APPARATUS INCLUDING FEEDING APPARATUS, AND FEEDING METHOD

This application is based upon and claims the benefit of priority from Japanese Patent Application No. 2009-279053, filed on Dec. 9, 2009, and Japanese Patent Application No. 2010-157788, filed on Jul. 12, 2010, the disclosure of which are incorporated herein in their entirety by reference.

TECHNICAL FIELD

The present invention relates to a feeding apparatus, an electronic apparatus including the feeding apparatus, and a feeding method, and in particular, relates to a feeding apparatus which can turn an object inside out automatically.

BACKGROUND ART

There is a paper feeding apparatus which automatically feeds a paper to be read, on which information composed of characters or the like is recorded, or a paper to be printed one. This kind of paper feeding apparatus is mounted on an electronic apparatus such as a facsimile machine, a scanning machine, a printing machine, a copying machine or the like. The paper feeding apparatus is one of the feeding apparatus.

This kind of paper feeding apparatus includes, for example, a circular paper feeding path, a paper introducing inlet arranged on the paper feeding path, a paper discharging path branched from the paper feeding path and extended to a paper discharging outlet, a pair of paper feeding rollers arranged on the paper feeding path and which pinches the paper and feeds the paper in a first direction (first circling direction), and a pair of paper discharging and reverse feeding rollers arranged on the paper discharging path, which pinches the paper and feeds the paper in a forward direction to the paper discharging outlet and feeds the paper in a backward direction to return the paper to the paper feeding path. Each roller, included in the pair of paper discharging and reverse feeding rollers, is arranged so as to be facing to a first surface (one of a front surface and a back surface) of paper or a second surface (the other of the front surface and the back surface) of paper respectively. The pair of paper discharging and reverse feeding rollers feeds the paper using the rollers being driven to be rotated by a driving source in the opposite direction of each other.

The paper feeding apparatus works as follows. First, the pair of paper feeding rollers feeds a paper, which is inserted from the paper introducing inlet, on the paper feeding path in the first direction while keeping a front edge of the paper as a feeding head. When the paper is fed on the paper feeding path in the first direction, information is read, for example, from the first surface of the paper by an optical head. Next, the pair of paper feeding rollers and the pair of paper discharging and reverse feeding rollers feed the paper, whose information indicated on the first surface is read, on the paper discharging path in the forward direction while keeping the front edge of the paper as the feeding head and put the paper on the paper discharging path. Afterward, the pair of paper feeding rollers and the pair of paper discharging and reverse feeding rollers feed the paper, which is put on the paper discharging path, on the paper discharging path in the backward direction while keeping a rear edge of the paper as the feeding head, and furthermore, feed the paper on the paper feeding path in the first direction. When the paper is fed on the paper feeding path in the first direction, information is read from the second surface of the paper by an optical head. Next, the pair of paper feeding rollers and the pair of paper discharging and reverse feeding rollers feed the paper, whose information indicated on the front surface and the back surface is read, on the paper feeding path in the first direction while keeping the rear edge of the paper as the feeding head and feed the paper on the paper discharging path in the forward direction and then, discharge the paper from the paper discharging outlet.

According to the paper feeding apparatus mentioned above, a rear edge of a paper which is fed on the paper discharging path in the backward direction in order to be returned to the paper feeding path, and a front edge of another paper which is fed on the paper discharging path in the forward direction in order to be discharged from the paper discharging outlet are rubbed together at between the paper discharging and reverse feeding rollers. At this time, the front edge of another paper, which is fed in the forward direction, may be deformed in some cases. As a result, another paper fails in being introduced into a space between the paper discharging and reverse feeding rollers and then, the paper is bent and torn.

As a measure to cope with the above-mentioned defect, there is a paper feeding apparatus which can prevent from both of papers being rubbed together. The paper feeding apparatus has the pair of paper discharging and reverse feeding rollers, which of each roller being moved away from the other roller, when two papers pass each other.

Figure 1:
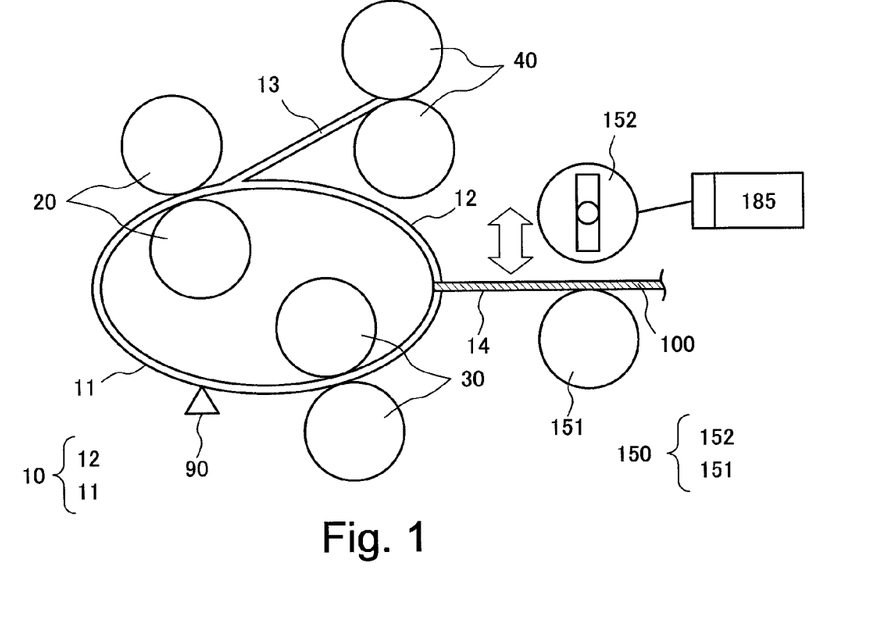
FIG. 1 is a schematic cross section view showing a paper feeding apparatus according to a related art of the present invention.

With reference to FIG. 1, the paper feeding apparatus, which applies the measure, includes a pair of paper discharging and reverse feeding rollers 150, composed of a first paper discharging and reverse feeding roller 151 and a second paper discharging and reverse feeding roller 152 which of the roller is facing each other through a paper, arranged on a paper discharging path 14, an un-illustrated sensor to detect that a front edge of the paper reaches to the pair of paper discharging and reverse feeding rollers 150, and a solenoid 185 which drives the second paper discharging and reverse feeding roller 152 to move the second paper discharging and reverse feeding roller 152 away from the first paper discharging and reverse feeding roller 151 based on a detection signal generated by the sensor. Further, symbols 20 and 30 indicate respectively pairs of paper feeding rollers which are arranged on a paper feeding path 10 composed of sections 11 and 12. Symbol 40 indicates a pair of paper introducing rollers which is arranged on a paper introducing path 13 for introducing a paper into the paper feeding path 10.

Further, a kind of paper feeding apparatus, which can turn a paper inside out automatically, is disclosed, for example, in Japanese Patent Application Laid-Open No. 2005-335915 (hereinafter, patent document 1), Japanese Patent Application Laid-Open No. 2006-103946 (hereinafter, patent document 2), Japanese Patent Application Laid-Open No. 1993-310356 (hereinafter, patent document 3) and Japanese Patent Application Laid-Open No. 1997-86807 (hereinafter, patent document 4).

A paper feeding apparatus disclosed in the patent document 1 includes a paper discharging and reverse feeding roller which is connected to a driving source, and a pinch roller which is facing to the paper discharging and reverse feeding roller through a paper and which is a slave roller for the paper discharging and reverse feeding roller. The paper discharging and reverse feeding roller is arranged on the upper side and the pinch roller is arranged on the lower side, and the paper discharging and reverse feeding roller is constituted so as to be shifted in an upper direction. According to the above mentioned structure, it can prevents a paper which has been just discharged, from returning accidentally to the paper feeding path together with another paper which is fed in the backward direction.

A paper feeding apparatus disclosed in the patent document 2 includes a pair of paper discharging and reverse feeding rollers which are facing each other through a paper, a sensor to detect that a front edge of a paper reaches near to the pair of paper discharging and reverse feeding rollers, and a combination of a stepping motor and a lever mechanism which drives one paper discharging and reverse feeding roller on the basis of a detection signal generated by the sensor so that the one paper discharging and reverse feeding roller may be moved away from the other paper discharging and reverse feeding roller.

A paper feeding apparatus disclosed in the patent document 3 includes a tri-roll apparatus which is arranged at a boundary area of a paper feeding path and a paper discharging path, and a driving roller and a pinch roller which are facing each other through a paper. Pressing force of the pinch roller is set quite weak. In the case that two papers are introduced between the driving roller and the pinch roller, the pinch roller moves away from the driving roller.

A paper feeding apparatus disclosed in the patent document 4 includes a driving roller and a slave roller which are facing each other through a paper, and a solenoid which drives the slave roller so that the slave roller may be moved away from the driving roller in the case that two papers are introduced between the driving roller and the pinch roller.

SUMMARY

An exemplary object of the present invention is to provide a feeding apparatus, an electronic apparatus including the feeding apparatus, and a feeding method, which resolve a problem that a conventional feeding apparatus has many components, complex structure, and difficulty in miniaturization, and furthermore, suffers from high manufacturing cost.

A feeding apparatus according to an exemplary aspect of the invention includes an object feeding path, a temporary object feeding path branched from the object feeding path, an object feeding unit arranged on the object feeding path, the object feeding unit feeding an object; and a pair of rollers arranged on the temporary object feeding path. The pair of rollers pinches the object and feeds the object from the object feeding path toward the temporary object feeding path while keeping one edge of the object as a feeding head. The pair of rollers pinching the object and feeding the object from the temporary object feeding path toward the object feeding path while keeping the other edge of the object as a feeding head. The pair of rollers includes a first roller which is driven to rotate by a driving source, and a second roller which presses the object against the first roller and which is driven to be rotated by a driving source. The second roller is supported so as to be move away from the first roller as the second roller moves closer to the object feeding path from a stationary position where the second roller presses the object against the first roller. The second roller is shifted by frictional force generated between the object and the second roller, so as to be moved away from the first roller after the other edge of the object, fed from the temporary object feeding path toward the object feeding path, reaches to the object feeding unit.

An electronic apparatus according to an exemplary aspect of the invention includes a feeding apparatus and at least one of a printing head. The feeding apparatus includes an object feeding path, a temporary object feeding path branched from the object feeding path, an object feeding unit arranged on the object feeding path, the object feeding unit feeding an object; and a pair of rollers arranged on the temporary object feeding path. The pair of rollers pinches the object and feeds the object from the object feeding path toward the temporary object feeding path while keeping one edge of the object as a feeding head. The pair of rollers pinching the object and feeding the object from the temporary object feeding path toward the object feeding path while keeping the other edge of the object as a feeding head. The pair of rollers includes a first roller which is driven to rotate by a driving source, and a second roller which presses the object against the first roller and which is driven to be rotated by a driving source. The second roller is supported so as to be move away from the first roller as the second roller moves closer to the object feeding path from a stationary position where the second roller presses the object against the first roller. The second roller is shifted by frictional force generated between the object and the second roller, so as to be moved away from the first roller after the other edge of the object, fed from the temporary object feeding path toward the object feeding path, reaches to the object feeding unit. The printing head makes information recorded on an object which is fed on the object feeding path, and a reading head which reads information which is recorded on the object.

A feeding method according to an exemplary aspect of the invention includes a step in which a pair of rollers, which includes a first roller and a second roller which presses an object against the first roller, pinches the object and feeds the object from an object feeding path toward a temporary object feeding path while keeping one edge of the object as a feeding head, a step in which the pair of rollers feeds the object from the temporary object feeding path toward the object feeding path while keeping the other edge of the object as a feeding head; and a step in which the second roller feeds the object as the second roller being shifted by frictional force generated between the object and the second roller, so as to be moved away from the first roller after the other edge of the object fed from the temporary object feeding path toward the object feeding path, reaches to an object feeding unit arranged on the object feeding path.

BRIEF DESCRIPTION OF THE DRAWINGS

Exemplary features and advantages of the present invention will become apparent from the following detailed description when taken with the accompanying drawings in which.

EXPLANATION OF THE SYMBOLS

10 Paper feeding path
210 Object feeding path
11 and 12 Section
13 Paper introducing path
14 Paper discharging path
141 Paper discharging outlet
20 and 30 Pair of paper feeding rollers
40 Pair of paper introducing rollers
50 and 150 Pair of paper discharging and reverse feeding roller
51 and 151 First paper discharging and reverse feeding roller
52 and 152 Second paper discharging and reverse feeding roller
60 Spring
70 Torque limiter
80 Clutch
90 CCD line sensor
92, 92' and 292 Supporting member
921, 921' and 2921 Slit unit
95 Motor
100, 101 and 102 Paper
101A and 102A First surface
101B and 102B Second surface
101f and 102f Front edge
101r and 102r Rear edge
F52, F52', F252' Pressing force
F101 Frictional force
185 Solenoid
203 Object
203f One edge
203r Other edge
210a One end of object feeding path
210b Other end of object feeding path
220 Object feeding unit
251 First roller
252 Second roller
270 and 280 Driving source
293 Rotary shaft

EXEMPLARY EMBODIMENT

A First Exemplary Embodiment

A paper feeding apparatus according to a first embodiment includes a circular paper feeding path, a paper discharging path, a pair of paper feeding rollers, and a pair of paper discharging and reverse feeding roller. The pair of paper feeding roller is arranged on the paper feeding path. The pair of paper feeding roller pinches the paper and feeds a paper in the paper feeding path in a circling direction. The paper discharging path branches from the paper feeding path and extends to a paper discharging outlet. The pair of paper discharging and reverse feeding rollers is arranged on the paper discharging path. Moreover, the pair of paper discharging and reverse feeding rollers pinches the paper and feeds the paper in a forward direction while keeping a front edge of the paper as a feeding head. The forward direction is a direction to a discharging outlet. Furthermore, the pair of paper discharging and reverse feeding rollers feeds the paper in a backward direction while keeping a rear edge of the paper as the feeding head. The backward direction is a direction to the paper feeding path. Moreover, the pair of paper discharging and reverse feeding rollers includes a first paper discharging and reverse feeding roller and a second paper discharging and reverse feeding roller. The first paper discharging and reverse feeding roller is driven to be rotated by a driving source. The second paper discharging and reverse feeding roller presses the paper against the first paper discharging and reverse feeding roller with predetermined pressing force, and simultaneously, is driven to be rotated by a driving source.

In particular, the second paper discharging and reverse feeding roller is supported so as to be movable on a siding path which extends obliquely so that the second paper discharging and reverse feeding roller may be gradually moved away from the first paper discharging and reverse feeding roller as the second paper discharging and reverse feeding roller approaches to the paper feeding path from a stationary position. The stationary position is the position where the second paper discharging and reverse feeding roller presses the paper against the first paper discharging and reverse feeding roller. When the rear edge of the paper, which is fed on the paper feeding path in the backward direction while keeping the rear edge of the paper as the feeding head, reaches to the pair of paper feeding rollers, rotation by the driving source is resumed. Afterward, the second paper discharging and reverse feeding roller is shifted on the siding path in a direction far from the first paper discharging and reverse feeding roller by frictional force of the paper which is fed by the pair of paper feeding rollers.

According to the above mentioned structure of the paper feeding apparatus of the exemplary embodiment, when two papers pass each other, the second discharging and reverse feeding roller moves away from the first paper discharging and reverse feeding roller. For this reason, two papers are not rubbed together. Moreover, the paper feeding apparatus has small number of components, simple structure, an advantage in miniaturization, and furthermore, a feature of low manufacturing cost because it is unnecessary for the paper feeding apparatus to include a driving source and a link mechanism such as a solenoid or the like for making one of the pair of paper discharging and reverse feeding rollers move away from the paper, and a sensor to detect that a second paper reaches to the pair of paper discharging and reverse feeding rollers, Next, the paper feeding apparatus according to the exemplary embodiment will be described with reference to a drawing.

Figure 2:
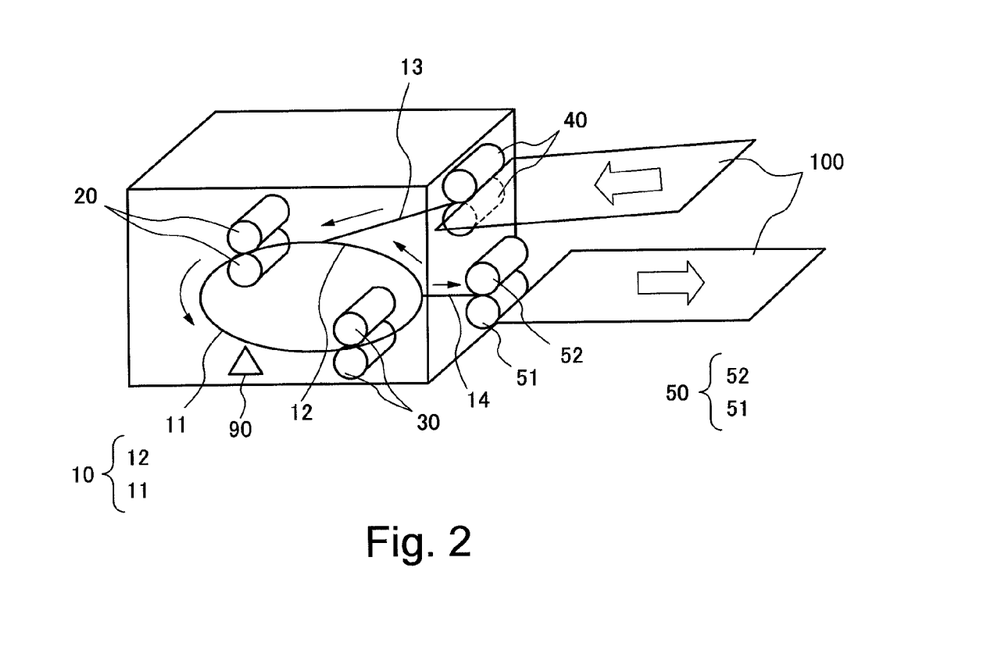
FIG. 2 is a schematic perspective view of a paper feeding apparatus according to a first exemplary embodiment of the present invention.
Figure 3:
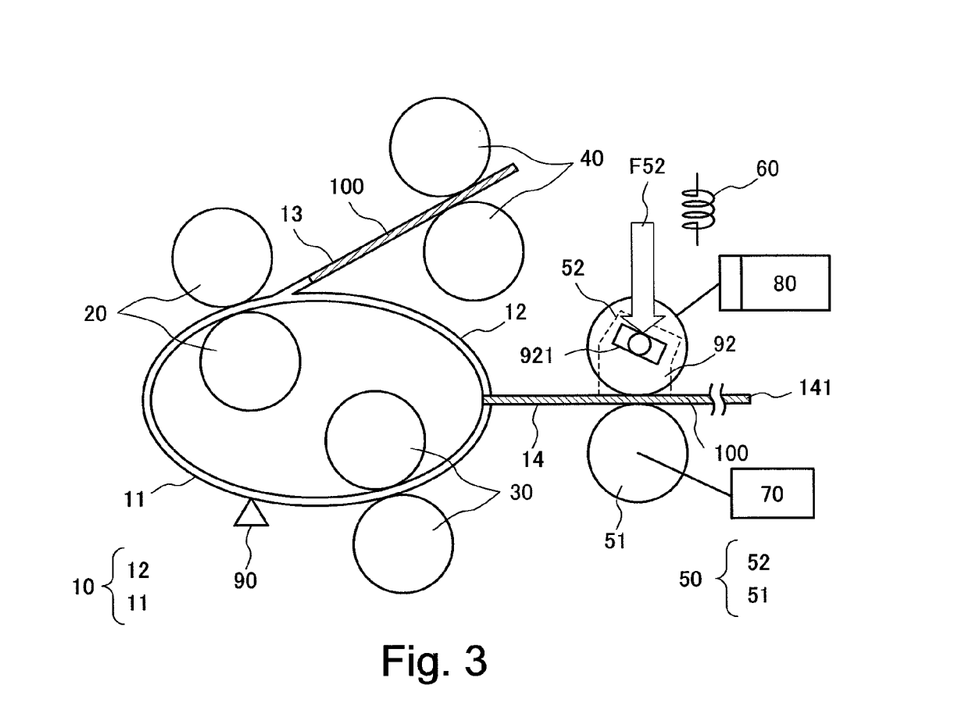
FIG. 3 is a schematic cross section view showing the paper feeding apparatus according to the first exemplary embodiment of the present invention.

With reference to FIG. 2 and FIG. 3, the paper feeding apparatus according to the first exemplary embodiment of the present invention is mounted on a facsimile machine. The paper feeding apparatus feeds automatically a paper 100 as a reading paper on which information composed of characters or the like is recorded, and in particular, can turn the paper 100 inside out automatically.

The paper feeding apparatus includes the circular paper feeding path 10 composed of the sections 11 and 12, the paper introducing path 13, the paper discharging path 14, the pairs of paper feeding rollers 20 and 30, the pair of paper introducing rollers 40, a pair of paper discharging and reverse feeding rollers 50, and a power supply circuit and a control circuit which are not illustrated. A CCD line sensor 90 is mounted on the section 11 of the paper feeding path 10 as a reading head which reads information recorded on the paper 100 fed on the paper feeding path 10.

The paper introducing path 13 is for introducing a paper into the paper feeding path 10. The pair of paper introducing rollers 40 is arranged on the paper introducing path 13. The pair of paper introducing rollers 40 pinches the paper 100 and feeds the paper toward a direction of the paper feeding path.

The pairs of paper feeding rollers 20 and 30 are arranged on the paper feeding path 10 respectively. The pairs of paper feeding rollers 20 and 30 pinch the paper 100 and feed the paper 100 in a circling direction (counter clockwise as shown in the figure).

The paper discharging path 14 branches from the paper feeding path 10 and extends to a paper discharging outlet 141. The pair of paper discharging and reverse feeding rollers 50 is arranged on the paper discharging path 14. The pair of paper discharging and reverse feeding rollers 50 pinches the paper 100 and feeds the paper 100 in the forward direction while keeping the front edge of the paper 100 as the feeding head. The forward direction is the direction to the paper discharging outlet 141 (right direction as shown in the figure). Moreover, The pair of paper discharging and reverse feeding rollers 50 feeds the paper 100 in the backward direction while keeping the rear edge of the paper 100 as the feeding head. The back ward direction is the direction to the paper feeding path 10 (left direction as shown in the figure)

The pair of paper discharging and reverse feeding rollers 50 includes a first paper discharging and reverse feeding roller 51 and a second paper discharging and reverse feeding roller 52. The first paper discharging and reverse feeding roller 51 is driven to be rotated by a motor 95 (FIG. 7) as the driving source. The second paper discharging and reverse feeding roller 52 presses the paper 100 against the first paper discharging and reverse feeding roller 51 with predetermined pressing force F52 by use of a spring 60. Moreover, the second paper discharging and reverse feeding roller 52 is driven to be rotated by the motor 95 or another motor which is not illustrated. Further, an illustration of mechanical connection between the spring 60 and the second paper discharging and reverse feeding roller 52 is omitted in the figure. Moreover, the first paper discharging and reverse feeding roller 51 is driven to be rotated by the driving source only when the first paper discharging and reverse feeding roller 51 feeds the paper 100 on the paper discharging path 14 in the forward direction.

Furthermore, the paper feeding apparatus includes a clutch 80 and a torque limiter 70. The clutch 80 transmits or does not transmit driving force of the motor 95 to the second paper discharging and reverse feeding roller 52 based on an instruction issued by a control unit. Therefore, when the clutch 80 is on, the second paper discharging and reverse feeding roller 52 is driven to be rotated counter clockwise, and feeds the paper 100 on the paper discharging path 14 in the backward direction. The torque limiter 70 makes the first paper discharging and reverse feeding roller 51 and its shaft slipped each other when counter clockwise torque, whose value is larger than one of predetermined torque, is applied to the first paper discharging and reverse feeding roller 51 as shown in the figure. Therefore, the shaft rotates clockwise, and simultaneously, the first paper discharging and reverse feeding roller 51 rotates counter clockwise as shown in the figure.

According to the paper feeding apparatus, the second paper discharging and reverse feeding roller 52 is supported by a supporting member 92 which includes a slit unit 921. Specifically, the second paper discharging and reverse feeding roller 52 is supported so as to be movable on the slit unit 921. The slit unit 921 is the siding path extending obliquely so that the second paper discharging and reverse feeding roller 52 may gradually move away from the first paper discharging and reverse feeding roller 51 as the second paper discharging and reverse feeding roller 52 approaches to the paper feeding path 10 from a stationary position. The stationary position is a position where the second paper discharging and reverse feeding roller 52 presses the paper against the first paper discharging and reverse feeding roller 51 with the pressing force F52.

As mentioned later, when the rear edge of the paper 100, which is fed on the paper discharging path 14 in the backward direction while keeping the rear edge of the paper 100 as the feeding head, reaches to the pair of paper feeding rollers 20 via the section 12 of the paper feeding path 10, rotation by the driving source is resumed. Afterward, the second paper discharging and reverse feeding roller 52 is shifted along the slit unit 921 to be moved away from the first paper discharging and reverse feeding roller 51 by frictional force of the paper which is fed by the pair of paper feeding rollers 20.

According to the above mentioned structure of the paper feeding apparatus, when the front edge and the rear edge of the paper pass each other, the second discharging and reverse feeding roller 52 moves away from the first paper discharging and reverse feeding roller 51. For this reason, the front edge and the rear edge of the paper 100 are not rubbed together. Moreover, it is unnecessary for the paper feeding apparatus to include a driving source and a link mechanism such as a solenoid or the like for making one roller, which composes the pair of paper discharging and reverse feeding rollers, move away from the paper, and a sensor to detect that a second paper reaches to the pair of paper discharging and reverse feeding rollers.

Further, it may be preferable that the first paper discharging and reverse feeding roller is driven to be rotated by the driving source only when the first discharging and reverse feeding roller feeds the paper on the paper discharging path in the forward direction.

It may be preferable that the paper feeding apparatus includes furthermore a supporting member which has a notch for the siding path, and a bearing which is installed on the rotary shaft of the second paper discharging and reverse feeding roller in a state that the second paper discharging and reverse feeding roller can rotate. Then, it may be preferable that the second paper discharging and reverse feeding roller can shift along the notch of the supporting member via the bearing.

Moreover, it may be preferable that the pressing force of the second paper discharging and reverse feeding roller is generated by use of a spring member or by use of weight of the second paper discharging and reverse feeding roller.

Furthermore, it may be preferable that the second paper discharging and reverse feeding roller has a higher circling speed than one of the pair of paper feeding rollers.

An electronic apparatus, which includes a paper feeding apparatus, and a printing head to print information in a paper fed on the paper feeding path and/or a reading head to read information which is printed on the paper fed on the paper feeding path, is realized by use of the paper feeding apparatus according to the exemplary embodiment.

Next, an operation of the paper feeding apparatus will be described with another reference to FIGS. 4 to 14.

Figure 4:
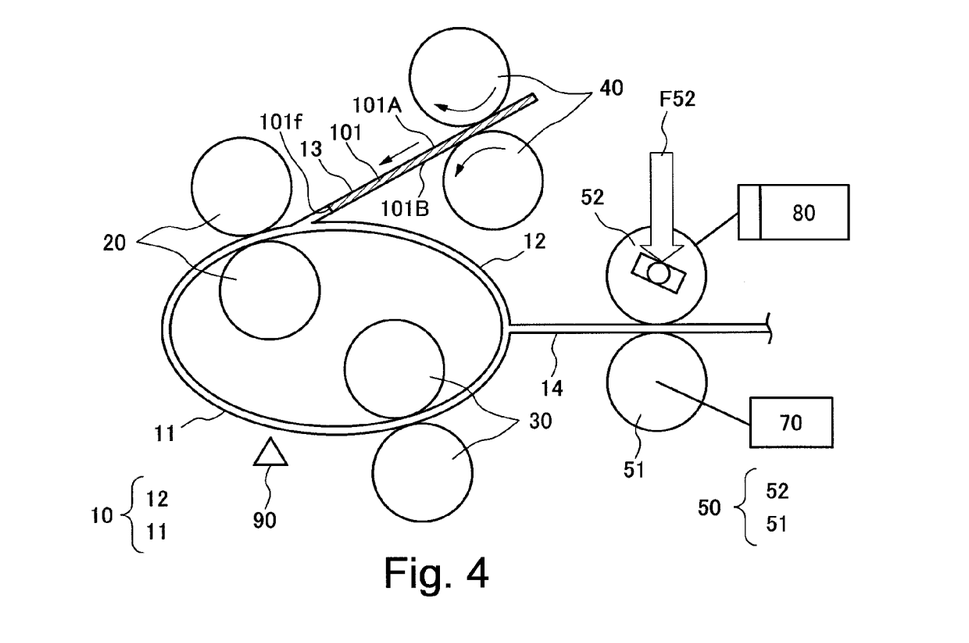
FIG. 4 is an explanatory diagram for an operation of the paper feeding apparatus according to the first exemplary embodiment of the present invention.

First, as shown in FIG. 4, the paper introducing roller 40 feeds a paper 101 on the paper introducing path 13 toward the paper feeding path 10 while keeping a front edge 101f as the feeding head.

Figure 5:
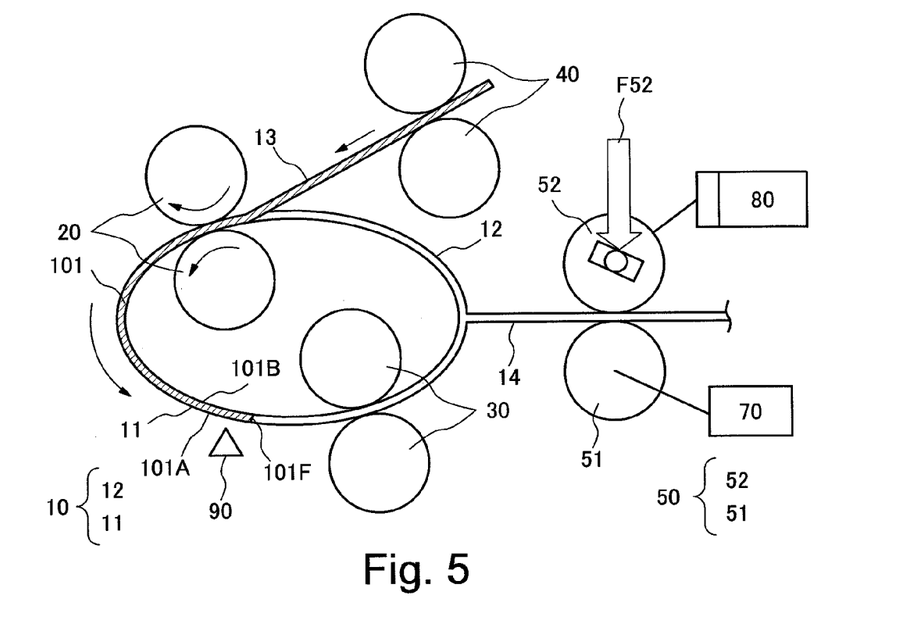
FIG. 5 is an explanatory diagram for an operation of the paper feeding apparatus according to the first exemplary embodiment of the present invention.

Next, as shown in FIG. 5, the pair of paper feeding rollers 20 feeds the paper 101, which is inserted from the paper introducing path 13, counter clockwise on the section 11 of the paper feeding path 10 while keeping the front edge 101f as the feeding head. When the paper 101 is fed on the section 11 of the paper feeding path 10, information is read by the CCD line sensor 90 from a first surface 101A of the paper 101.

Figure 6:
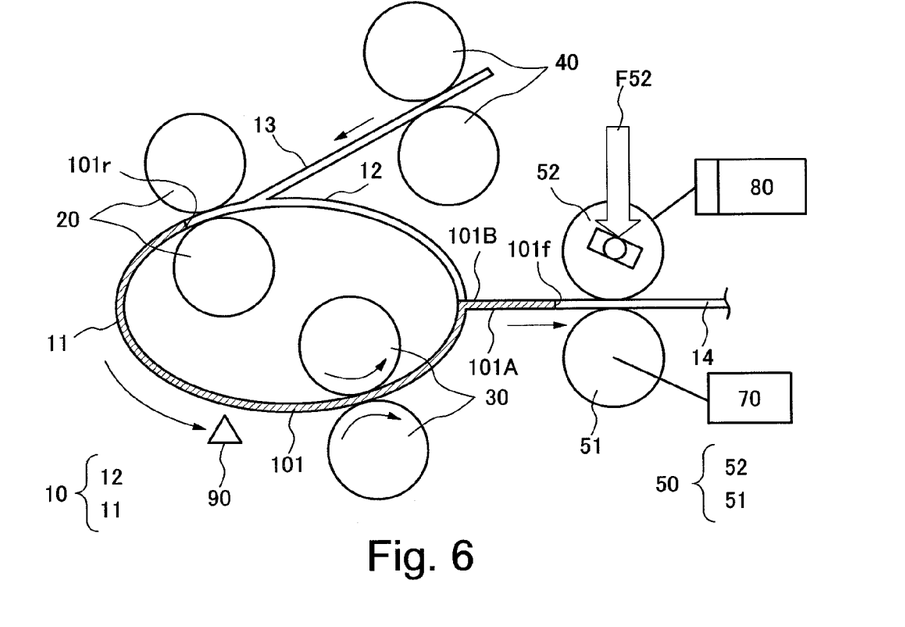
FIG. 6 is an explanatory diagram for an operation of the paper feeding apparatus according to the first exemplary embodiment of the present invention.

Next, as shown in FIG. 6, the pair of paper feeding rollers 30 feeds the paper 101 in counter clockwise direction on the section 11 of the paper feeding path 10. Then, the paper 101 is introduced into the paper discharging path 14 while keeping the front edge 101f as the feeding head.

Figure 7:
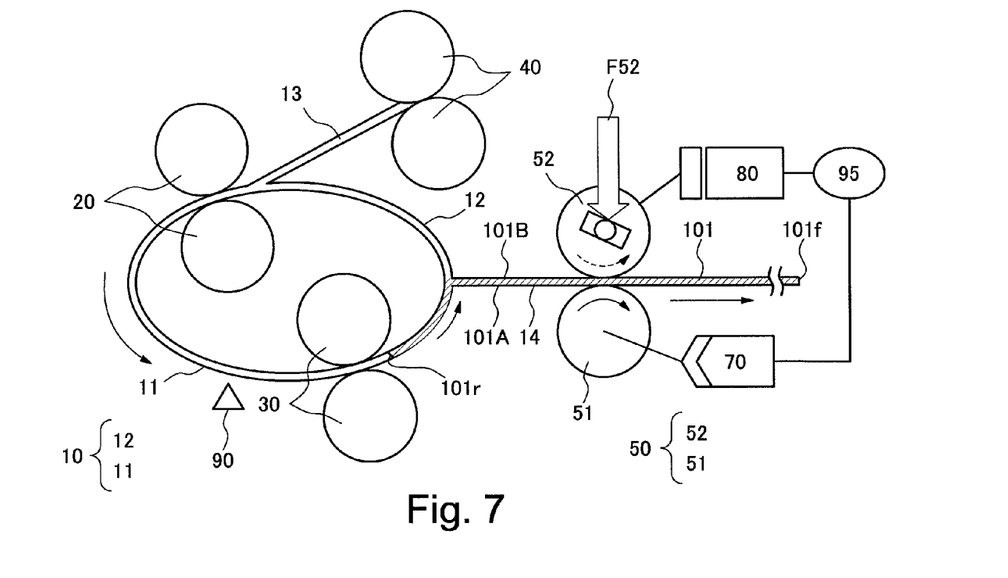
FIG. 7 is an explanatory diagram for an operation of the paper feeding apparatus according to the first exemplary embodiment of the present invention.

Afterward, the first paper discharging and reverse feeding roller 51 is driven to be rotated clockwise by the motor 95 and feeds the paper 101 on the paper discharging path 15 in the right direction while keeping the front edge 101f as the feeding head, as shown in FIG. 7. Further, since the second paper discharging and reverse feeding roller 52 is not driven to be rotated according to an off state of the clutch 80, the second paper discharging and reverse feeding roller 52 rotates counter clockwise subordinately by power of the first paper discharging and reverse feeding roller 51 as shown in the figure.

Figure 8:
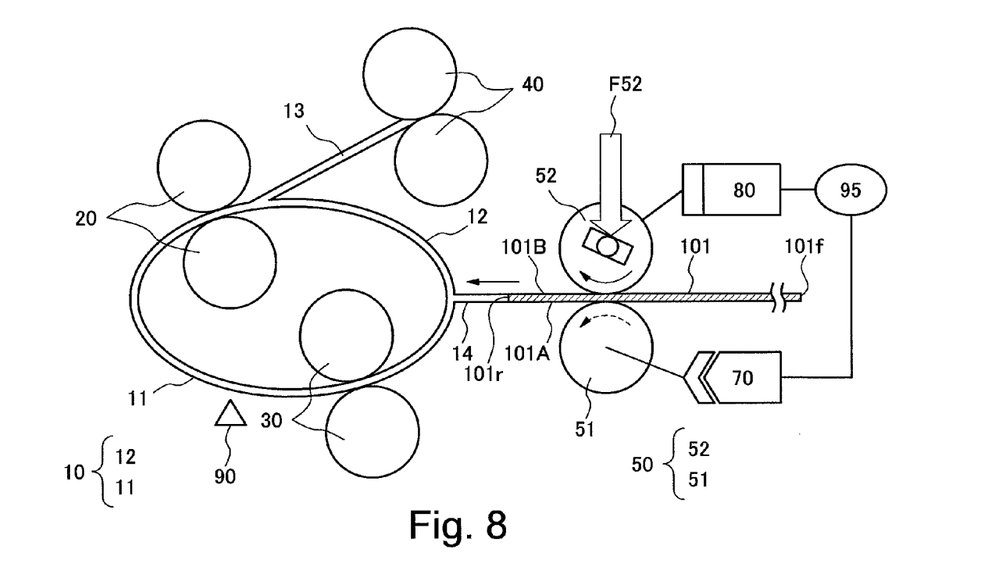
FIG. 8 is an explanatory diagram for an operation of the paper feeding apparatus according to the first exemplary embodiment of the present invention.
Figure 9:
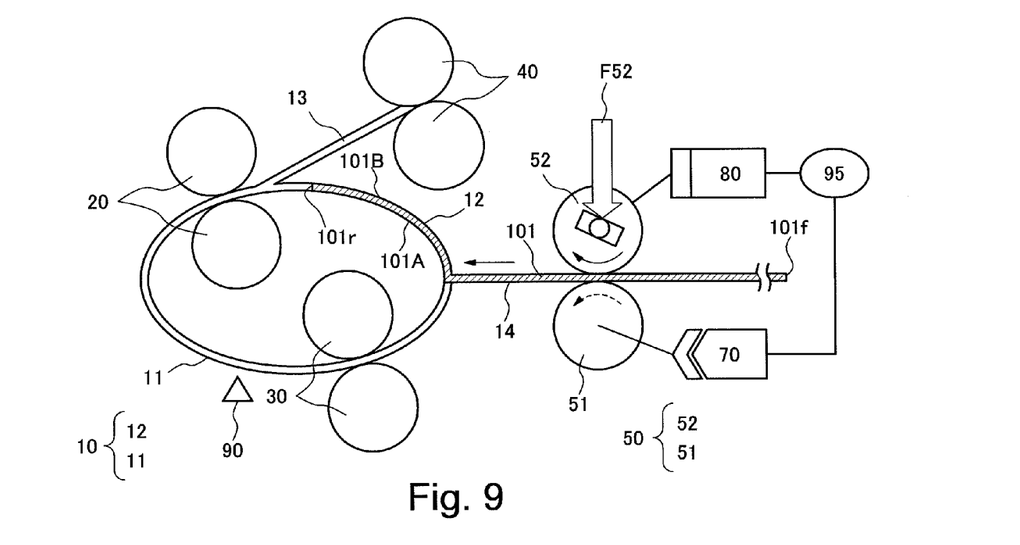
FIG. 9 is an explanatory diagram for an operation of the paper feeding apparatus according to the first exemplary embodiment of the present invention.

Next, as shown in FIG. 8, when a rear edge 101r of the paper 101 passes a cross point of the section 11, the section 12 and the paper discharging path 14, the clutch 80 turns on and the second paper discharging and reverse feeding roller 52 is driven to be rotated clockwise by the motor 95. The second paper discharging and reverse feeding roller 52 feeds the paper 101 on the paper discharging path 14 in the left direction toward the paper feeding path 10 while keeping the rear edge 101r of the paper 101 as the feeding head, as shown in the figure. Further, since the torque limiter 70 slips, the first paper discharging and reverse feeding roller 51 rotates counter clockwise subordinately by power of the second paper discharging and reverse feeding roller 52, as shown in the figure. As shown in FIG. 9, the paper 101 is introduced into the section 12 of the paper feeding path 10 while keeping the rear edge 101r of the paper 101 as the feeding edge.

Figure 10:
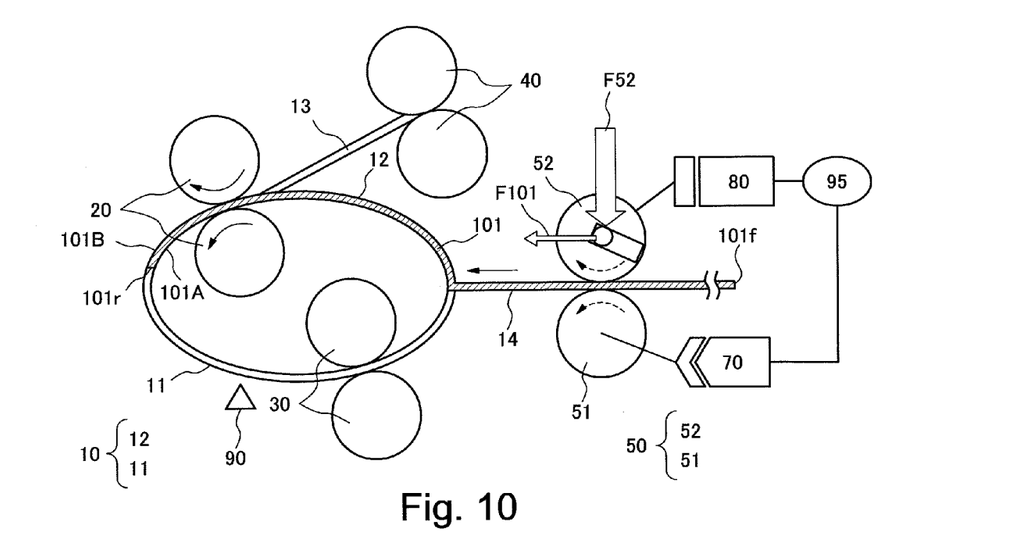
FIG. 10 is an explanatory diagram for an operation of the paper feeding apparatus according to the first exemplary embodiment of the present invention.

As shown in FIG. 10, when the rear edge 101r of the paper 101 reaches to the pair of paper feeding rollers 20, the clutch 80 turns off, and consequently, the second paper discharging and reverse feeding roller 52 loses the driving force for rotation. The pair of paper feeding rollers feeds the paper 101, which is introduced from the paper discharging path 14, in counter clockwise direction on the sections 11 and 12 of the paper feeding path 10 while keeping the rear edge 101r as the feeding head, as shown in the figure. Further, the first paper discharging and reverse feeding roller 51 rotates subordinately since the torque limiter 70 slips, and simultaneously, the second paper discharging and reverse feeding roller 52 rotates subordinately since the clutch 80 turns off. In particular, frictional force F101 generated by a second surface 101B of the paper 101 is applied to the rotary shaft of the second paper discharging and reverse feeding roller 52.

Figure 11:
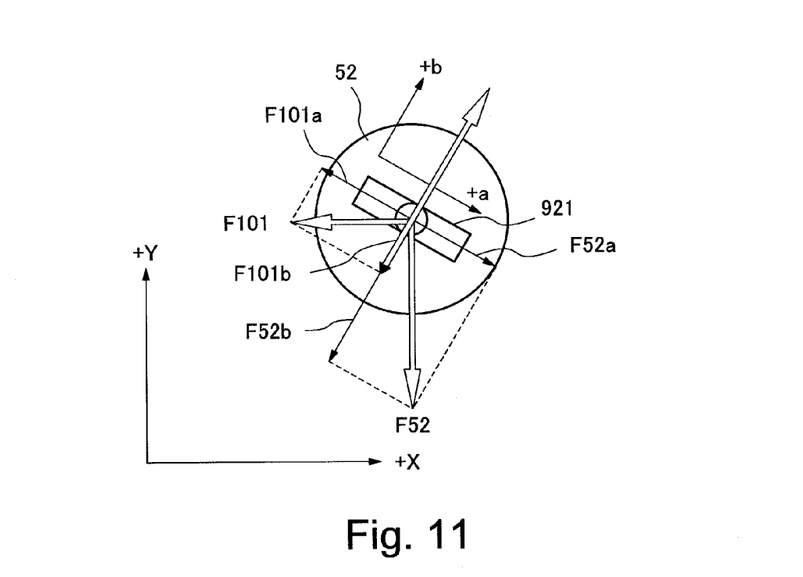
FIG. 11 shows a relation of force which is applied to a second paper discharging and reverse feeding roller according to the first exemplary embodiment of the present invention.

In detail, FIG. 11 shows force which is applied to the shaft of second paper discharging and reverse feeding roller 52. With reference to FIG. 11, the pressing force F52 in "−Y direction" generated by the spring 60 (FIG. 3) can be divided into component force F52a and component force F52b. The component force F52a is a force directed in "+a direction" along the slit unit 921 corresponding to the siding path. The component force F52b is a force directed in "−b direction" which is vertical to the component force F52a. Meanwhile, the frictional force F101, which is generated in "−X direction", is divided into component force F101a which is directed in "−a direction", and component force F101b which is directed in "−b direction". Here, since an amount of shift (movement) of the shaft of the second paper discharging and reverse feeding roller 52 in "+/−b direction" is limited by width of the slit unit 921, it is possible to ignore force in "−b direction", that is, the component force F101b and the component force F52b. Accordingly, when the component force F101a of the frictional force F101 in "−a direction" is larger than the component force F52a of the pressing force F52 in "+a direction", the shaft of the second paper discharging and reverse feeding roller 52 shifts in "−a direction" along the slit unit 921. This means that the second paper discharging and reverse feeding roller 52 moves away from the first paper discharging and reverse feeding roller 51.

Figure 12:
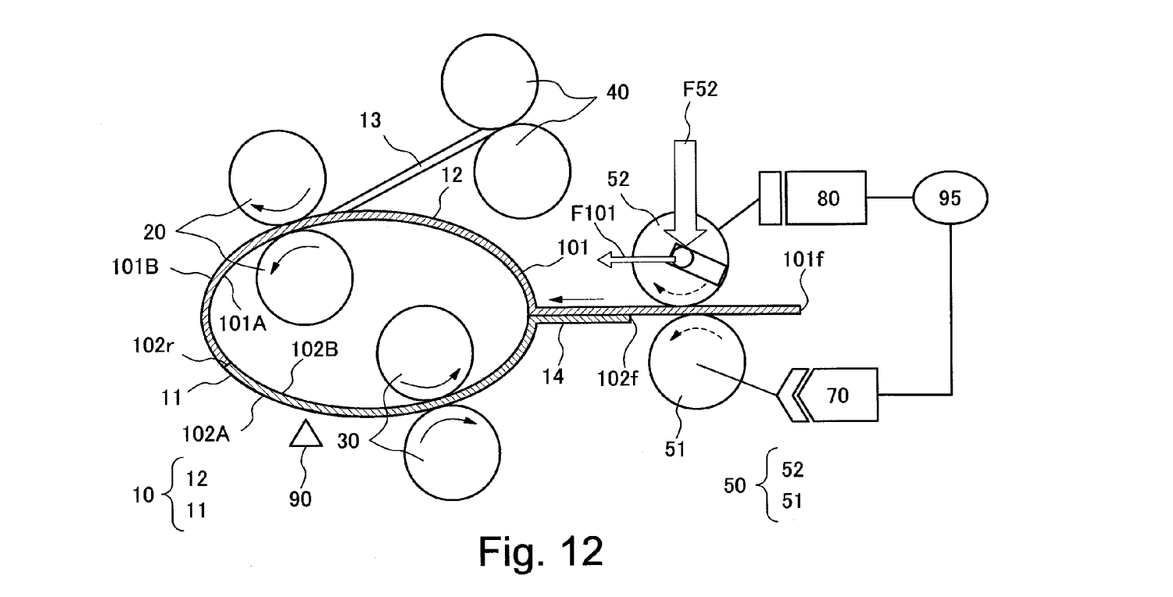
FIG. 12 is an explanatory diagram for an operation of the paper feeding apparatus according to the first exemplary embodiment of the present invention.

Next, as shown in FIG. 12, the pair of paper feeding rollers 20 feeds the paper 101 in counter clockwise direction on the section 11 of the paper feeding path 10 while keeping the rear edge of the paper 101 as the feeding head. When the paper 101 is fed on the section 11 of the paper feeding path 10, information is read by the CCD line sensor 90 from the second surface 101B of the paper 101. At this time, it is supposed that a next paper 102 is fed by the pair of paper feeding rollers 30 while keeping a front edge 102f of the paper 102 as the feeding head.

Figure 13:
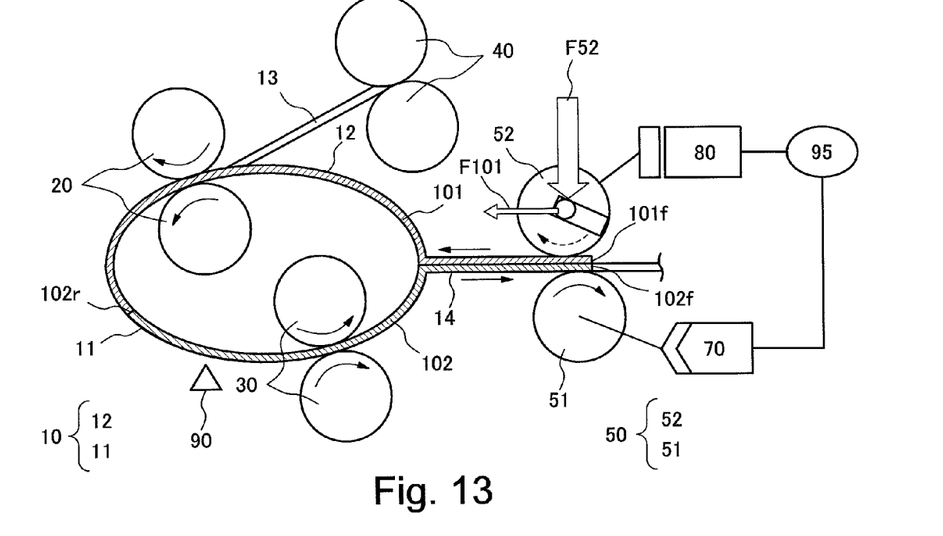
FIG. 13 is an explanatory diagram for an operation of the paper feeding apparatus according to the first exemplary embodiment of the present invention.

As shown in FIG. 13, when the paper 101 and the paper 102 pass each other, both papers are not rubbed together since paper discharging and reverse feeding roller 52 moves away from the first paper discharging and reverse feeding roller 51. Further, since the torque limiter 70 is in a state of not slipping, the first paper discharging and reverse feeding roller 51 is driven to be rotated clockwise by the motor 95 and feeds the paper 102 on the paper discharging path 14 in the right direction while keeping the front edge 102f of the paper 102 as the feeding head as shown in the figure.

Figure 14:
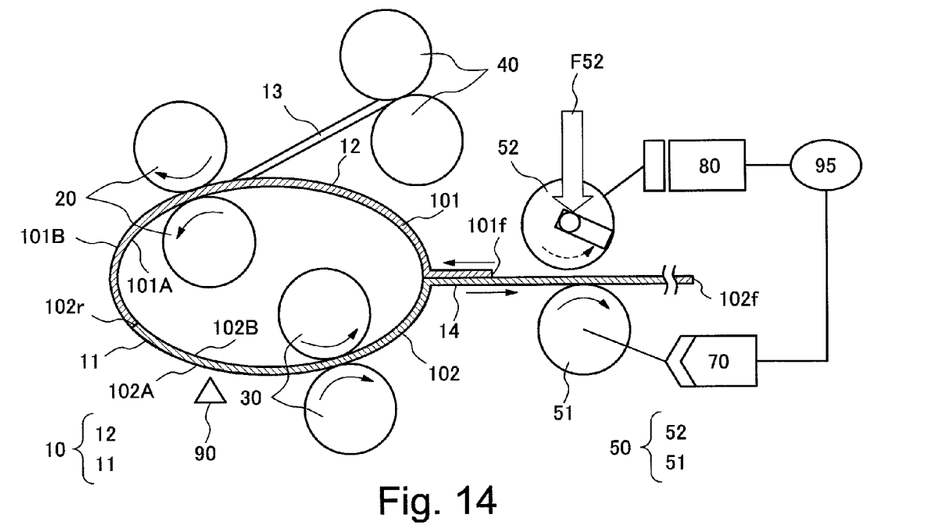
FIG. 14 is an explanatory diagram for an operation of the paper feeding apparatus according to the first exemplary embodiment of the present invention.

Afterward, the first paper discharging and reverse feeding roller 51 is driven to be rotated clockwise by the motor 95, and feeds the paper 101 on the paper discharging path 14 in the right direction while keeping the rear edge 101r of the paper 101 as the feeding head. Further, since the second paper discharging and reverse feeding roller 52 is not driven to be rotated according to an off state of the clutch 80, the second paper discharging and reverse feeding roller 52 rotates counter clockwise subordinately by power of the first paper discharging and reverse feeding roller 51 as shown in the figure. Then, the paper 101, whose information is read from both of the first surface 101A and the second surface 101B, is discharged from the paper discharging outlet 141 (FIG. 3) while keeping the rear edge of the paper 101 as the feeding head.

A Second Exemplary Embodiment

A paper feeding apparatus according to a second exemplary embodiment of the present invention is different from one according to the first embodiment in a point that the paper feeding apparatus according to the second exemplary embodiment further includes a bearing of the second paper discharging and reverse feeding roller. For this reason, an identical portion or an equivalent portion of the second exemplary embodiment to the first exemplary embodiment is assigned the same symbol as one of the first exemplary embodiment and a detailed explanation is omitted.

Figure 15:
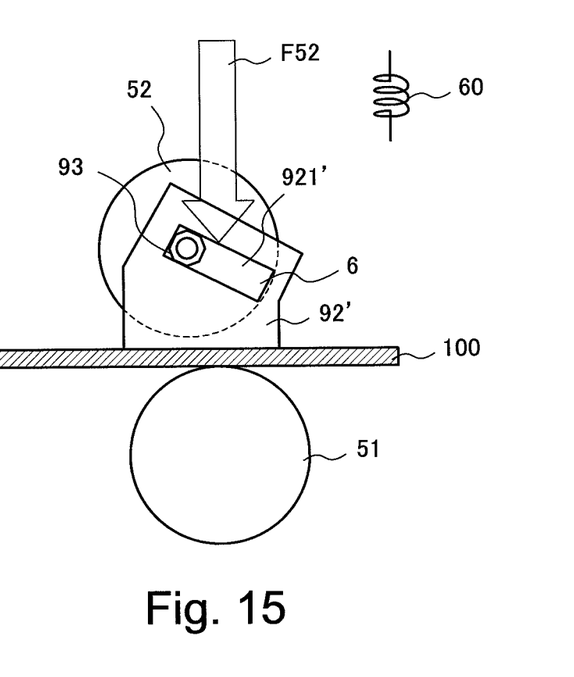
FIG. 15 is a schematic cross section view showing a main part of a paper feeding apparatus according to a second exemplary embodiment of the present invention.

With reference to FIG. 15, the paper feeding apparatus according to the second exemplary embodiment of the present invention further includes a supporting metal member 92' which has a slit unit 921' to specify the siding path for the second paper discharging and reverse feeding roller 52, and a bearing 93 which is attached to the rotary shaft of the second paper discharging and reverse feeding roller 52 which is able to be rotated. The second paper discharging and reverse feeding roller 52 can shift along the slit unit 921' of the supporting metal member 92' via the bearing 93. The second paper discharging and reverse feeding roller 52 presses the paper 100 with the predetermined pressing force F52 against the first paper discharging and reverse feeding roller 51 by use of the spring 60, and simultaneously, is driven to be rotated by a motor which is not illustrated. Further, an illustration of mechanical connection between the spring 60 and the second paper discharging and reverse feeding roller 52 is omitted in the figure.

A Third Exemplary Embodiment

A paper feeding apparatus according to a third exemplary embodiment of the present invention is different from one according to the first embodiment in a point that the second paper discharging and reverse feeding roller presses a paper against the first paper discharging and reverse feeding roller not by use of a spring. For this reason, an identical portion or an equivalent portion of the third exemplary embodiment to the first exemplary embodiment is assigned the same symbol as one of the first exemplary embodiment and a detailed explanation is omitted.

Figure 16:
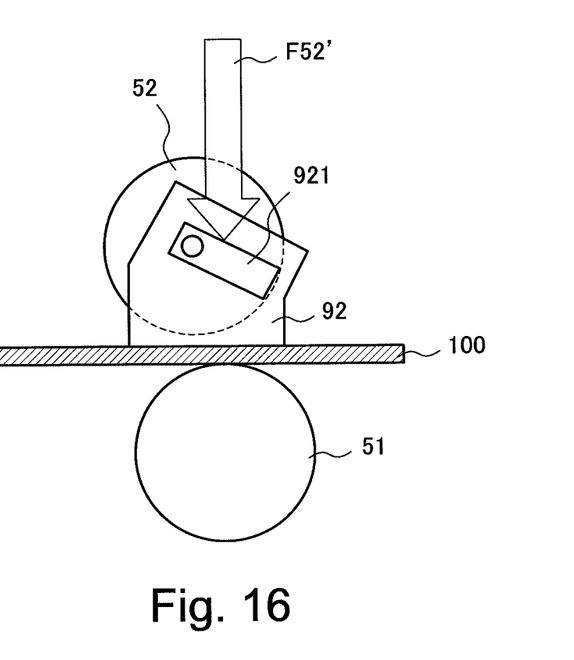
FIG. 16 is a schematic cross section view showing a main part of a paper feeding apparatus according to a third exemplary embodiment of the present invention.

According to the paper feeding apparatus of the third exemplary embodiment of the present invention, the second paper discharging and reverse feeding roller 52 presses the paper 100 against the first paper discharging and reverse feeding roller 51 with predetermined pressing force F52' which is generated by weight of the second paper discharging and reverse feeding roller 52, and simultaneously, is rotated by a motor, which is not illustrated, with reference to FIG. 16.

Since the weight of roller is used for pressing the paper 100, a component such as a spring and a mechanical connection means between the spring and the second paper discharging and reverse feeding roller is unnecessary according to the exemplary embodiment.

A Fourth Exemplary Embodiment

A paper feeding apparatus according to a fourth exemplary embodiment of the present invention is different from one of the first exemplary embodiment in a method of generating the frictional force, which makes the second paper discharging and reverse feeding roller shift in a direction far from the first paper discharging and reverse feeding roller. For this reason, FIG. 3 is used to describe the fourth exemplary embodiment. Moreover, a detailed explanation on an identical portion or an equivalent portion of the fourth exemplary embodiment to the first exemplary embodiment is omitted.

With reference to FIG. 3, according to the paper feeding apparatus of the fourth exemplary embodiment of the present invention, the circling speed of the paper discharging and reverse feeding roller 52 is slower than one of each roller which composes the pair of paper feeding rollers 20. To meet this condition, the second paper discharging and reverse feeding roller 52 is able to have a slower rotation speed than one of each roller which composes the pair of paper feeding rollers 20. Another way to meet this condition is that, while not illustrated, a diameter of the second paper discharging and reverse feeding roller 52 can be larger than one of each roller which composes the pair of paper feeding rollers 20.

As mentioned above, it is possible to generate the friction force between the second paper discharging and reverse feeding roller 52 and the paper 100, which is fed by the pair of paper feeding rollers 20, by making the circling speed of the second paper discharging and reverse feeding roller 52 slower than one of each roller which composes the pair of paper feeding rollers 20. As a result, it is possible to shift the second paper discharging and reverse feeding roller 52 by the friction force so as to be moved away from the first paper discharging and reverse feeding roller 51, after other edge of the paper 100, which is fed in the backward direction, reaches to the pair of paper feeding rollers 20.

A Fifth Exemplary Embodiment

Figure 17:
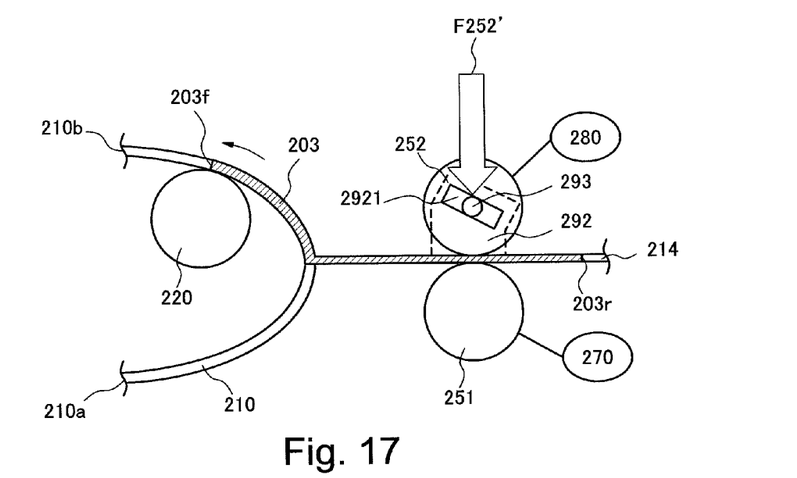
FIG. 17 is a schematic cross section view of a paper feeding apparatus according to a fourth exemplary embodiment of the present invention.
Figure 18:
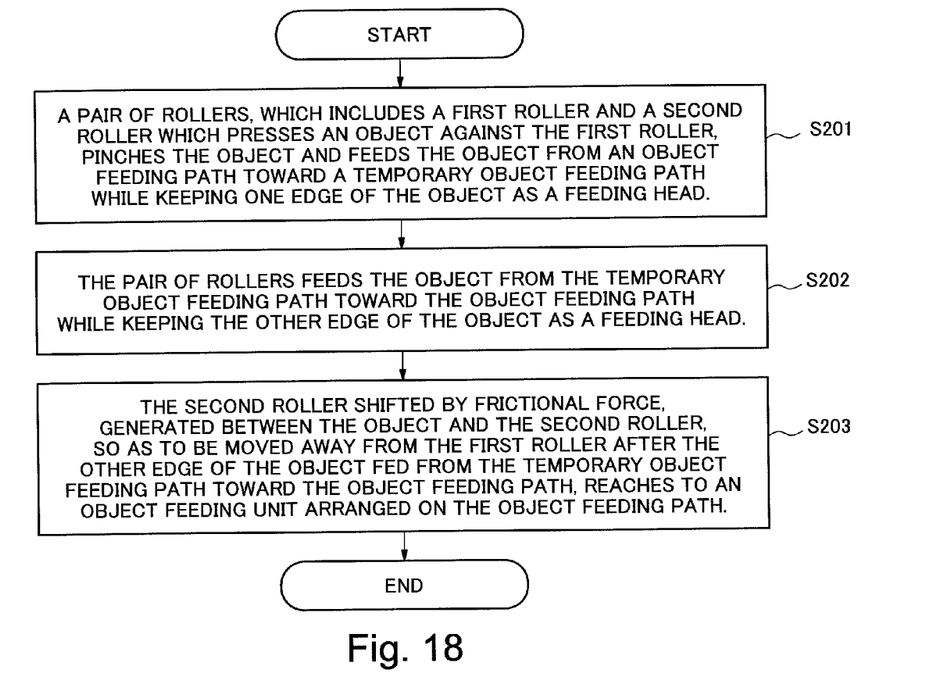
FIG. 18 is a flowchart showing a feeding method according to the fourth exemplary embodiment of the present invention.

FIG. 17 shows a feeding apparatus according to a fifth exemplary embodiment of the present invention. The feeding apparatus includes an object feeding path 210 and a temporary object feeding path 214 branched from the object feeding path 210. Furthermore, the feeding apparatus includes an object feeding unit 220 arranged on the object feeding path 210. The object feeding unit 220 feeds an object 203. Moreover, the feeding apparatus includes a pair of rollers composed of a first roller 251 and a second roller 252 which are arranged on the temporary object feeding path 214. The pair of rollers pinches the object 203 and feeds the pinched object 203 toward the temporary object feeding path 214 from the object feeding path 210 while keeping one edge 203f of the pinched object 203 as the feeding head. Moreover, the pair of rollers feeds the object 203 toward the object feeding path 210 from the temporary object feeding path 210 while keeping the other edge 203r of the object 203 as the feeding head.

The pair of rollers includes the first roller 251 driven to be rotated by a driving source 270, and the second roller 252 which presses the object 203 against the first roller 251 with predetermined pressing force F252' and is driven to be rotated by a driving source 280. The second roller 252 is supported so as to be moved away from the first roller 251 as the second roller 252 approaches to the object feeding path 203 from a stationary position where the second roller 252 presses the object 203 against the first roller 251. Moreover, after the other edge 203r of the object 203, which is fed from the temporary object feeding path 214 toward the object feeding path 210, reaches to the object feeding unit 220, the second roller 252 is shifted by frictional force generated between the object 203 and the second roller 252 so that the second roller 252 may be moved away from the first roller 251.

As mentioned above, according to the feeding apparatus of the exemplary embodiment, the second roller 252 is supported so as to be moved away from the first roller 251 as the second roller 252 approaches to the object feeding path 203 from the stationary position where the second roller 252 presses the object 203 against the first roller 251. Moreover, after the other edge 203*r* of the object 203, which is fed from the temporary object feeding path 214 toward the object feeding path 210, reaches to the paper feeding unit 220, the second roller 252 is shifted by the frictional force generated between the object 203 and the second roller 252 so that the second roller 252 may move away from the first roller 251. For this reason, when there are a plurality of objects 203, the feeding apparatus makes the second roller 252 move away from the first roller 251, while a front edge of a first object and a rear edge of a second object passing each other. As a result, it is possible to prevent the front edge of the first object and the rear edge of the second object from being rubbed together, and consequently, it is possible to prevent these objects from being bent and torn.

Moreover, since the feeding apparatus of the exemplary embodiment makes the second roller 252 move away from the first roller 251 by use of the frictional force generated between the object 203 and the second roller 252, it is possible to make the apparatus small and simple. Also, it is possible to make number of components simple. Specifically, it is unnecessary for the feeding apparatus of the exemplary embodiment to include a driving source and a link mechanism such as a solenoid or the like for making the second roller 252 move away from the object 203, and a sensor to detect that the second object reaches to the pair of rollers. Accordingly, it is possible to make an apparatus miniaturized by use of the feeding apparatus of the exemplary embodiment. Moreover, it is possible to make the apparatus manufacturing cost low, since number of components used in the apparatus is small.

Next, a feeding method according to the fifth exemplary embodiment of the present invention will be described with reference to FIG. 17.

First, the pair of rollers, which includes the first roller and the second roller to press an object against the first rollers, pinches the object and feeds the object from the object feeding path to the temporary object feeding path while keeping one edge of the object as the feeding head (S201).

Next, the pair of rollers feeds the object from the temporary object feeding path to the object feeding path while keeping the other edge of the object as the feeding head (S202).

Next, after the other edge of the object, which is fed from the temporary object feeding path toward the object feeding path, reaches to the object feeding unit arranged on the object feeding path, the second roller is shifted by the frictional force generated between the object and the second roller, so that the second roller may be moved away from the first roller, and feeds the object (S203).

According to the above mentioned method, it is possible to prevent the front edge of the first object and the rear edge of the second object from being rubbed together when the front edge of the first object and the rear edge of the second object pass each other. Consequently, it is possible to prevent these objects from being bent and torn, when there are a plurality of objects 203.

It may be preferable that the second roller 252 is supported by a supporting member 292 and a rotary shaft 293. It may be preferable that the rotary shaft 293 is arranged in a slit 2921 which is arranged in a slanting direction to a direction in which the second roller 252 presses the object 203 against the first roller 251. In this case, the second roller 252 can be shifted so as to be moved away from the first roller 251 through the rotary shaft 293 being shifted in the slit 2921.

As long as the object 203 is thin, flat and flexible so that the object 203 may be fed and fed back on the object feeding path 210 and the temporary object feeding path 214, material of the object 203 is not limited. It may be preferable that the object 203 is, for example, a paper as shown in the first to the fourth embodiments. Moreover, it may be preferable that the object 203 is a film or a sheet made of ceramics, plastics or synthetic resin.

As long as the object feeding unit 220 can feed the object 203, the object feeding unit 220 is not limited in structure. It may be preferable that the object feeding unit 220 is, for example, a roller as shown in FIG. 17. Moreover, it may be preferable that the object feeding unit 220 is corresponding to the pair of rollers which the paper feeding apparatus according to the first exemplary embodiment includes. Moreover, it may be preferable that the object feeding unit 220 feeds the object 203 in a direction indicated by an arrow in the figure, for example, by sucking the object 203.

It may be preferable that an object discharging outlet is arranged ahead of the temporary object feeding path 214 like the paper feeding apparatus of the first exemplary embodiment.

It may be preferable that one end 210*a* and the other end 210*b* of the object feeding path 210 are connected or are not connected each other. Accordingly, it may be preferable that, for example, one end 210*a* and the other end 210*b* of the object feeding path 210 are connected each other to make the object feeding path circular like the paper feeding apparatus according to the first exemplary embodiment.

It may be preferable that the driving source stops to drive rotation of the second roller 252 after the other edge 203*r* of the object, which is fed from the temporary object feeding path 214 toward the object feeding path 210, reaches to the object feeding unit 220. According to the above mention, it is possible to generate the friction force between the second roller 252 and the object 203. As a result, it is possible that the second roller 252 is shifted by the friction force so as to be moved away from the first roller 251 after the other edge 203*r* of the object 203 reaches to the object feeding unit 220.

Moreover, in the case that the object feeding unit 220 is set as a third roller, it is possible to generate the friction force between the second roller 252 and the object 203 by making the circling speed of the second roller slower than its of third roller.

A method to generate the predetermined pressing force F252' which presses the object 203 against the first roller 251 is not limited. It is possible to generate the pressing force F252', for example, by use of an elastic member such as a spring member or the like. Moreover, it is also possible to generate the pressing force F252' by use of weight of the second roller.

Further, the example shown in FIG. 1 and the examples disclosed in the patent document 2 and 4 require the driving source and the link mechanism such as the solenoid for making one roller, which composes the pair of object discharging and reverse feeding rollers, move away the object such as the paper. Additionally, these examples require the sensor for detecting that a second paper reaches to the pair of object feeding and reverse feeding rollers. Therefore, these examples have a problem that each of these examples requires a large number of components and must have complex structure and has difficulty in miniaturization and furthermore, suffers from high manufacturing cost.

Since each of examples disclosed in the patent documents 1 to 4 includes a combination of the roller which is connected to the driving source (driving roller or driving cylindrical shaft) and the slave roller (pinch roller or slave cylindrical shaft) which is not connected to the driving source, each of examples is different from the feeding apparatus, to which the present invention is applied and which includes the pair of rollers each of which is driven by the driving source individually.

An exemplary advantage according to the invention is that the feeding apparatus according to the present invention is miniaturized easily since the feeding apparatus has small number of components and simple structure, and furthermore, the feeding apparatus has a feature of low manufacturing cost.

The previous description of embodiments is provided to enable a person skilled in the art to make and use the present invention. Moreover, various modifications to these exemplary embodiments will be readily apparent to those skilled in the art, and the generic principles and specific examples defined herein may be applied to other embodiments without the use of inventive faculty. Therefore, the present invention is not intended to be limited to the exemplary embodiments described herein but is to be accorded the widest scope as defined by the limitations of the claims and equivalents.

Further, it is noted that the inventor's intent is to retain all equivalents of the claimed invention even if the claims are amended during prosecution.

The invention claimed is:

1. A feeding apparatus, comprising:
an object feeding path;
a temporary object feeding path branched from said object feeding path;
an object feeding unit arranged on said object feeding path, said object feeding unit feeding an object; and
a pair of rollers arranged on said temporary object feeding path, said pair of rollers pinching said object and feeding said object from said object feeding path toward said temporary object feeding path while keeping one edge of said object as a feeding head, said pair of rollers pinching said object and feeding said object from said temporary object feeding path toward said object feeding path while keeping the other edge of said object as a feeding head, wherein
said pair of rollers includes a first roller which is driven to rotate, only in a first direction, by a driving source, and a second roller which presses said object against said first roller and which is driven to be rotated, only in a second direction being opposite to the direction, by the driving source, wherein
said second roller is supported so as to be move away from said first roller as said second roller moves closer to said object feeding path from a stationary position where said second roller presses said object against said first roller, and wherein
said second roller is shifted by frictional force generated between said object and said second roller, so as to be moved away from said first roller after said other edge of said object, fed from said temporary object feeding path toward said object feeding path, reaches to said object feeding unit.

2. The feeding apparatus according to claim 1, wherein said second roller is supported by a rotary shaft, wherein said rotary shaft is arranged in a slit installed in a direction slanting to a direction in which said second roller presses said object against said first roller, and wherein said second roller is shifted so as to be moved away from said first roller as said rotary shaft shifts along said slit.

3. The feeding apparatus according to claim 1, wherein said second roller stops driving to rotate after said other edge of said object, fed from said temporary object feeding path toward said object feeding path, reaches to said object feeding unit.

4. The feeding apparatus according to claim 1, wherein said first roller is driven to be rotated by the driving source only when said first roller feeds said object from said object feeding path toward said temporary object feeding path.

5. The feeding apparatus according to claim 1, wherein the second roller which presses said object gains said first roller by a pressing force is generated by a spring member.

6. The feeding apparatus according to claim 1, wherein the second roller which presses said object against said first roller by a pressing force is generated by weight of said second roller.

7. The feeding apparatus according to claim 1, wherein said object feeding unit is a third roller, and wherein circling speed of said second roller is slower than circling speed of said third roller.

8. The feeding apparatus according to claim 1, wherein said object is a paper.

9. The feeding apparatus according to claim 1, wherein the first roller and the second roller are not driven to be rotated by the driving source at the same time.

10. An electronic apparatus, comprising:
a feeding apparatus, comprising:
an object feeding path;
a temporary object feeding path branched from said object feeding path;
an object feeding unit arranged on said object feeding path, said object feeding unit feeding an object; and
a pair of rollers arranged on said temporary object feeding path, said pair of rollers pinching said object and feeding said object from said object feeding path toward said temporary object feeding path while keeping one edge of said object as a feeding head, said pair of rollers pinching said object feeding said object from said temporary object feeding path toward said object feeding path while keeping the other edge of said object as a feeding head, wherein
said pair of rollers includes a first roller which is driven to be rotated, only in a first direction, by a driving source, and a second roller which presses said object against said first roller and which is driven to be rotated, only in a second direction being opposite to the first direction, by the driving source, wherein
said second roller is supported so as to be moved away from said first roller as said second roller moves closer to said object feeding path from a stationary position where said second roller presses said object against said first roller, and wherein
said second roller is shifted by frictional force generated between said object and said second roller, so as to be moved away from said first roller after said other edge of said object, fed from said temporary object feeding path toward said object feeding path, reaches to said object feeding unit; and
at least one of a printing head which makes information recorded on an object which is fed on said object feeding path, and a reading head which reads information which is recorded on said object.

11. The electronic apparatus according to claim 10, wherein
    said second roller is supported by a rotary shaft, wherein
    said rotary shaft is arranged in a slit installed in a direction slanting to a direction in which said second roller presses said object against said first roller, and wherein
    said second roller is shifted so as to be moved away from said first roller as said rotary shaft shifts along said slit.

12. The electronic apparatus according to claim 10, wherein
    said second roller stops driving to rotate after said other edge of said object, fed from said temporary object feeding path toward said object feeding path, reaches to said object feeding unit.

13. The electronic apparatus according to claim 10, wherein
    said first roller is driven to be rotated by the driving source only when said first roller feeds said object from said object feeding path toward said temporary object feeding path.

14. The electronic apparatus according to claim 10, wherein
    the second roller which presses said object against said first roller by a pressing force is generated by a spring member.

15. The electronic apparatus according to claim 10, wherein
    the second roller which presses said object against said first roller by a pressing force is generated by weight of said second roller.

16. The electronic apparatus according to claim 10, wherein
    said object feeding unit is a third roller, and wherein
    circling speed of said second roller is slower than circling speed of said third roller.

17. The electronic apparatus according to claim 10, wherein
    said object is a paper.

18. A feeding method, comprising:
    a step in which a pair of rollers, which includes a first roller and a second roller which presses an object against said first roller, pinches said object and feeds said object from an object feeding path toward a temporary object feeding path while keeping one edge of said object as a feeding head;
    a step in which said pair of rollers feeds said object from said temporary object feeding path toward said object feeding path while keeping the other edge of said object as a feeding head; and
    a step in which said second roller feeds said object as said second roller being shifted by frictional force generated between said object and said second roller, so as to be moved away from said first roller after said other edge of said object fed from said temporary object feeding path toward said object feeding path, reaches to an object feeding unit arranged on said object feeding path
    wherein said first roller is driven to rotate, only in a first direction, by a driving source, and a second roller is driven to be rotated, only in a second direction being opposite to the first direction, by a driving source.

* * * * *

UNITED STATES PATENT AND TRADEMARK OFFICE
CERTIFICATE OF CORRECTION

| | |
|---|---|
| PATENT NO. | : 8,505,909 B2 |
| APPLICATION NO. | : 12/938938 |
| DATED | : August 13, 2013 |
| INVENTOR(S) | : Noriyuki Hagiyama |

It is certified that error appears in the above-identified patent and that said Letters Patent is hereby corrected as shown below:

In the Specification

Column 6, Line 4: below "210b Other end of object feeding path", delete "214 Temporary object feeding path"

In the Claims

Column 15, Line 48: In Claim 1, delete "the direction" and insert -- the first direction --

Column 16, Line 12: In Claim 5, delete "gains" and insert -- against --

Signed and Sealed this
Fourth Day of November, 2014

Michelle K. Lee
*Deputy Director of the United States Patent and Trademark Office*